No. 817,725. PATENTED APR. 10, 1906.
F. C. OSBORN.
CASH REGISTER.
APPLICATION FILED NOV. 23, 1891.

7 SHEETS—SHEET 1.

WITNESSES
F. Clough.
D. W. Bradford

INVENTOR
Francis C. Osborn
by Parker & Burton
his Attorneys.

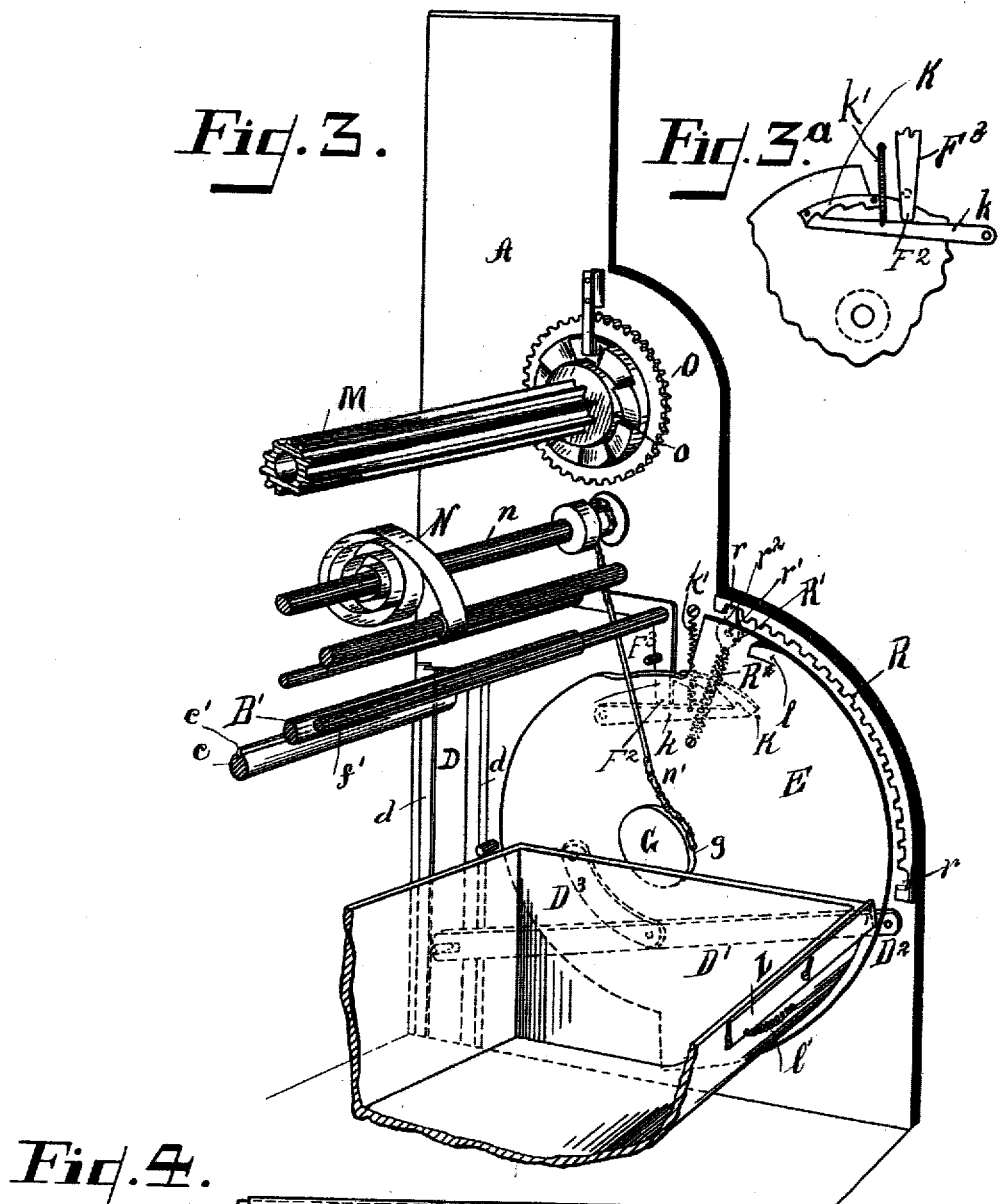

No. 817,725. PATENTED APR. 10, 1906.
F. C. OSBORN.
CASH REGISTER.
APPLICATION FILED NOV. 23, 1891.
7 SHEETS—SHEET 3.
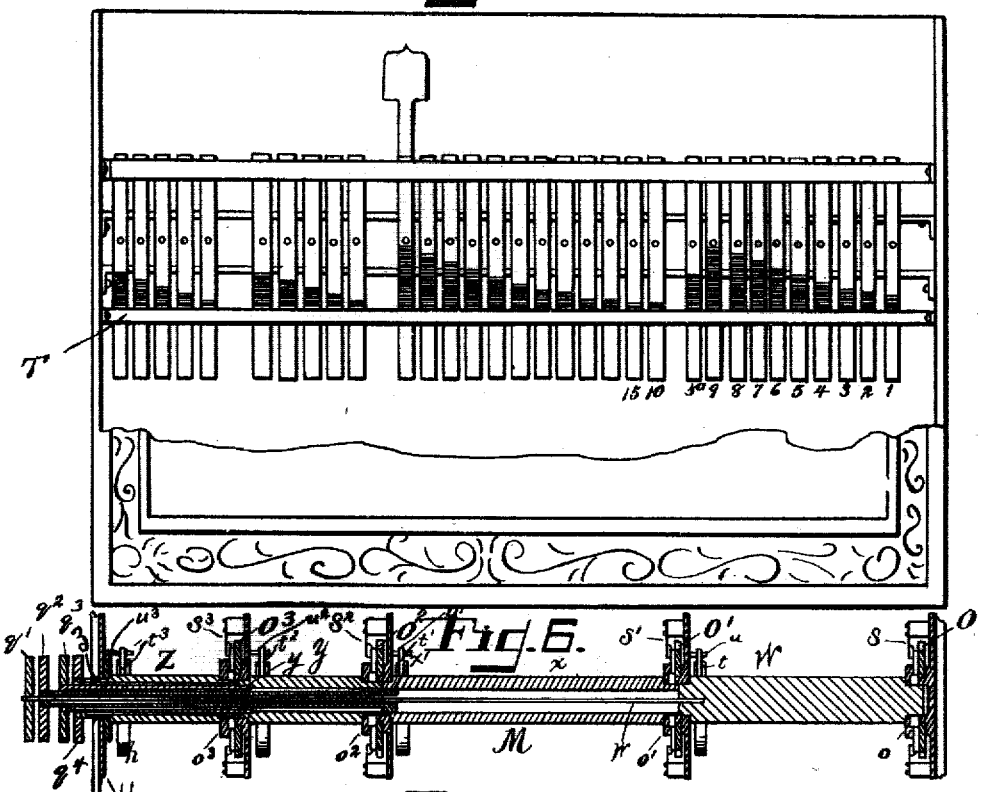
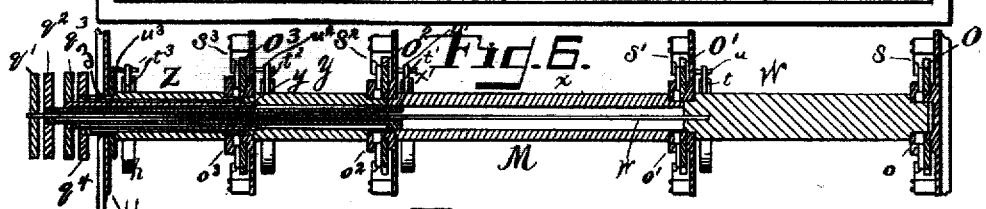
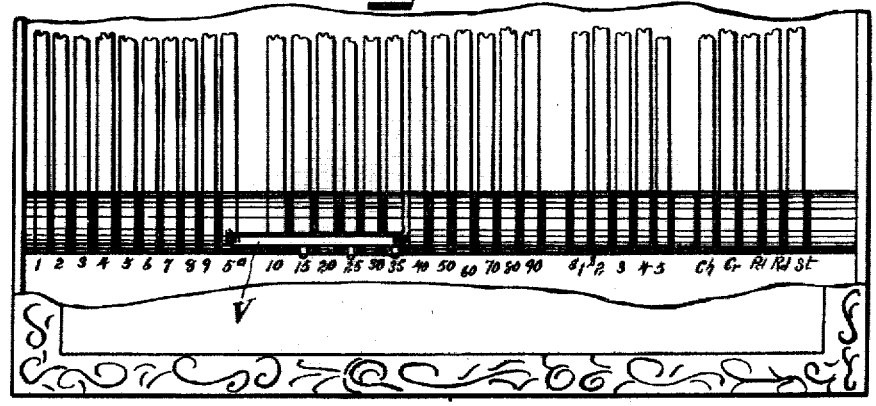
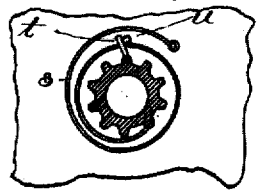
WITNESSES
INVENTOR
Francis C Osborn
by Parker & Burton
his Attorneys.

No. 817,725. PATENTED APR. 10, 1906.
F. C. OSBORN.
CASH REGISTER.
APPLICATION FILED NOV. 23, 1891.

7 SHEETS—SHEET 4.

WITNESSES
F. Clough.
D. W. Bradford

INVENTOR
Francis C. Osborn
by Parker & Burton
his Attorneys.

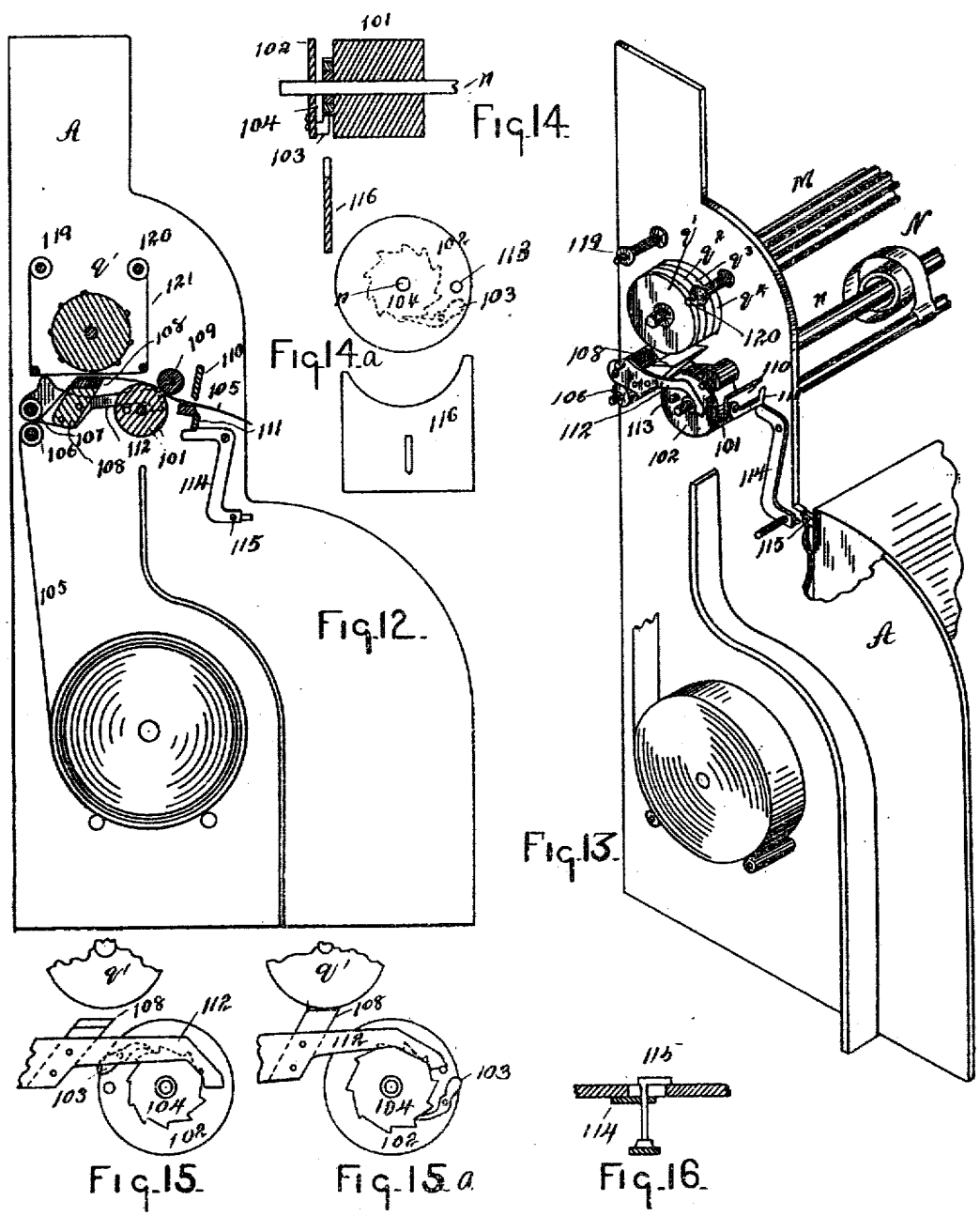

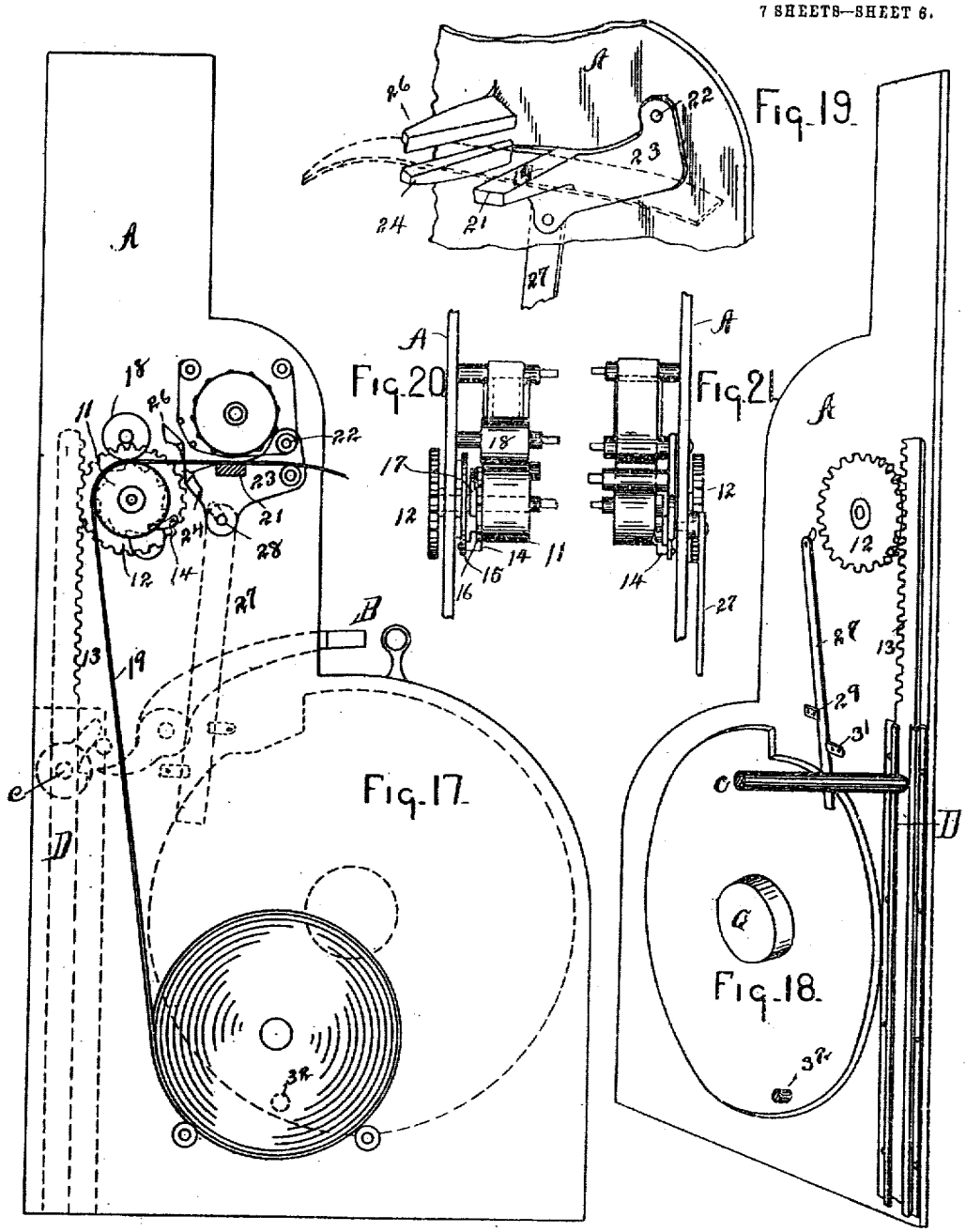

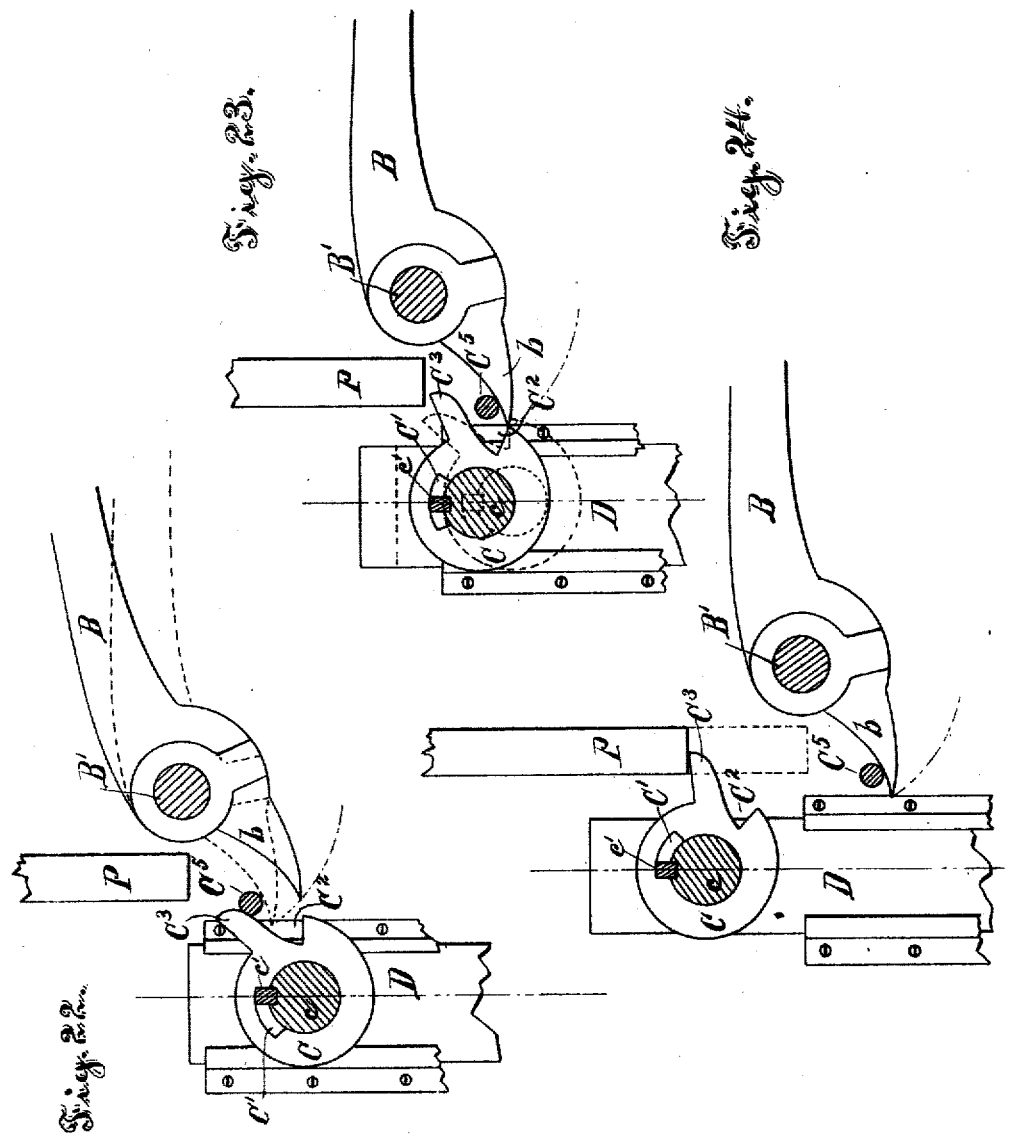

UNITED STATES PATENT OFFICE.

FRANCIS C. OSBORN, OF DETROIT, MICHIGAN, ASSIGNOR, BY MESNE ASSIGNMENTS, TO NATIONAL CASH REGISTER COMPANY, OF JERSEY CITY, NEW JERSEY, A CORPORATION OF NEW JERSEY.

CASH-REGISTER.

No. 817,725.  Specification of Letters Patent.  Patented April 10, 1906.

Application filed November 23, 1891. Serial No. 412,791.

*To all whom it may concern:*

Be it known that I, FRANCIS C. OSBORN, a citizen of the United States, residing at Detroit, in the county of Wayne and State of Michigan, have invented a certain new and useful Improvement in Cash-Registers, of which the following is a specification.

This invention relates to improvements in cash-registers, and has among its objects to provide improvements in the indicator mechanism thereof, including novel key-controlled devices therefor, also improvements in the recording mechanism associated therewith, including the control of the latter by a driving member, such as a hand-operated till-cover or similar operating means.

With these and incidental objects in view the invention consists in certain novel features of construction and combinations of parts, the essential elements of which are set forth in appended claims and a preferred form of embodiment of which is hereinafter specifically described with reference to the drawings which accompany and form part of this specification.

Figures 1, 2:
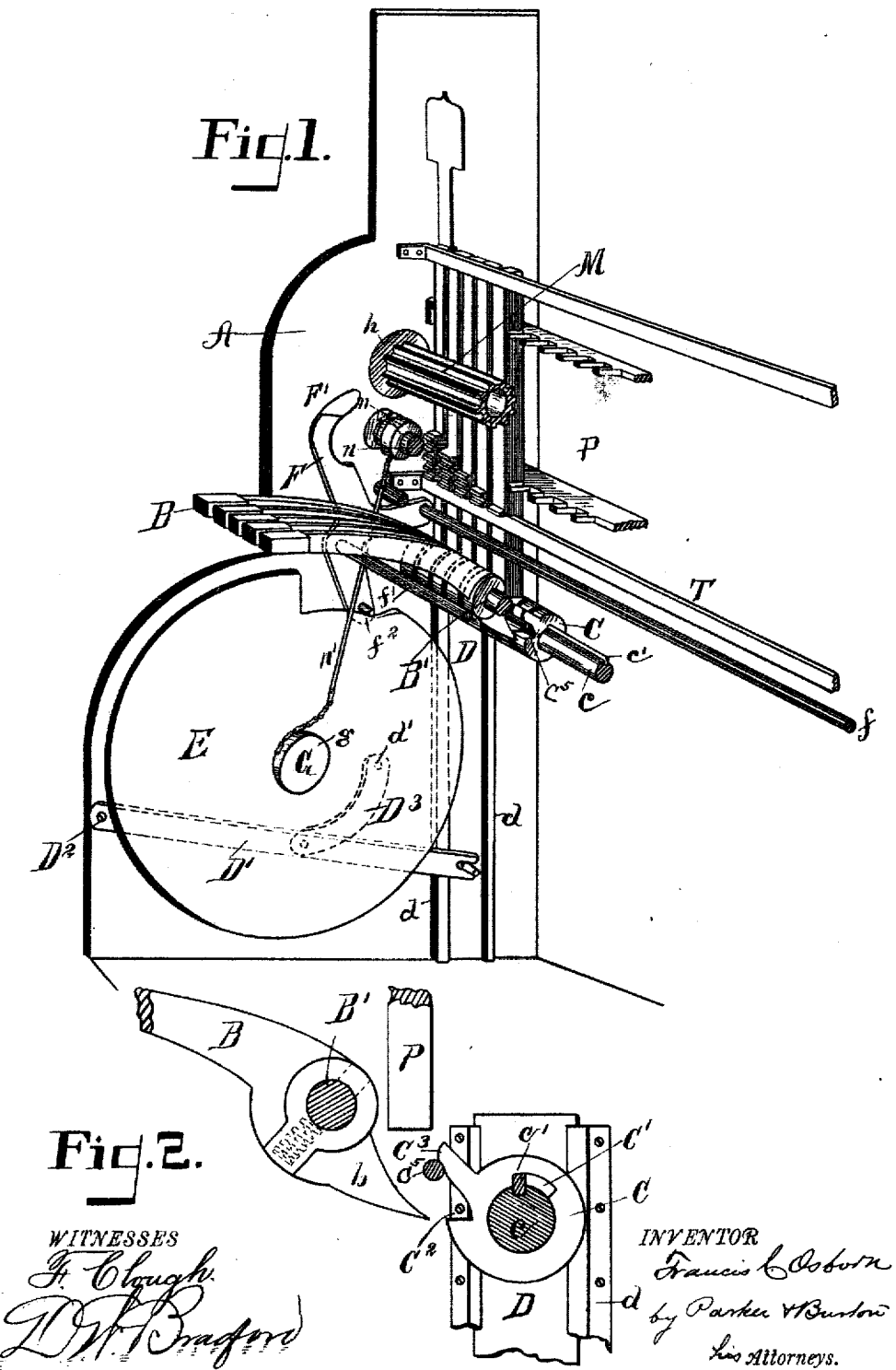
Figure 8:
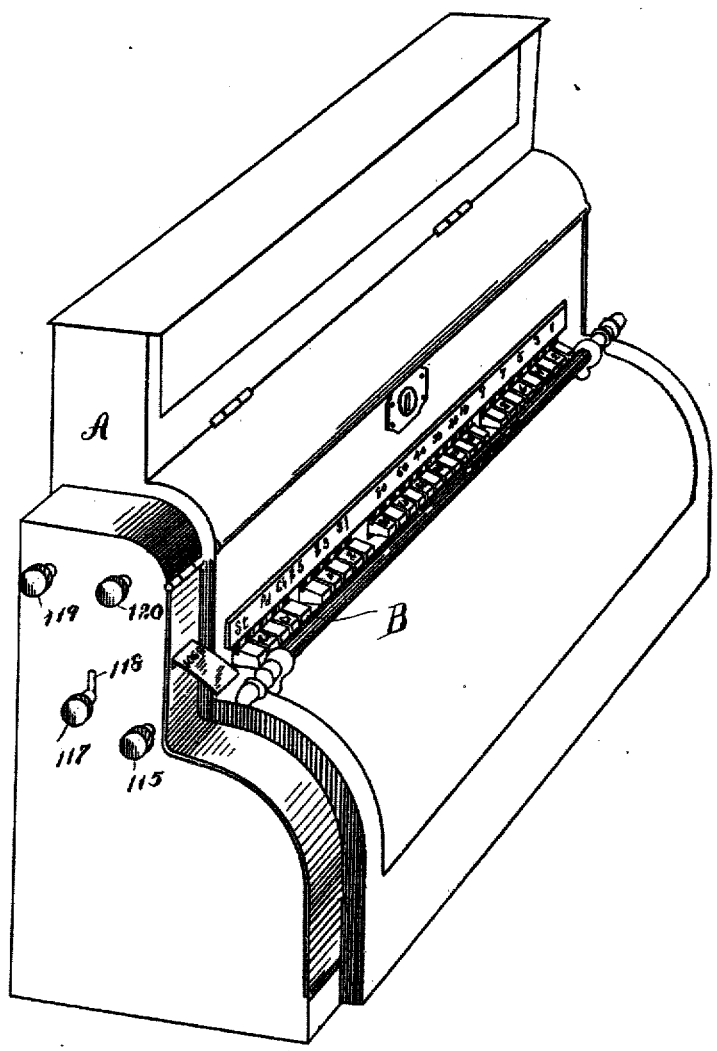
Figure 9:
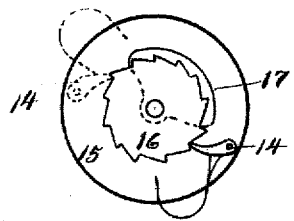
Figure 10:
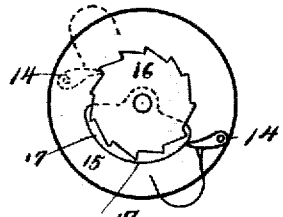

Of said drawings, Figure 1 shows in perspective an interior view of one end of the case and the parts supported by it. Fig. 2 shows a detail of the setting end of the key, the lifting-dog, and the lower end of the tablet-rod and their relative positions. Fig. 3 shows an interior view of the opposite end of the case from Fig. 1, giving details of construction. Fig. 3ª shows in detail the cover-lock. Fig. 4 shows the locking-bolt on the drawer-cover. Fig. 5 shows the tablet-rods in elevation. Fig. 6 shows the means of setting the printing or embossing wheels. Fig. 7 is a rear view of the lifting-dogs, indicating especially the means by which a unit of a higher order is coupled with the unit of a lower order in operating the recording or printing wheels. Fig. 8 is a perspective external view of the entire register. Figs. 9 and 10 show the masked ratchet used in feeding paper to the printing-wheels in the modified construction shown in Figs. 17 to 21. Fig. 11 is a section of the pinion M. Fig. 12 shows in section the printing mechanism. Fig. 13 shows in perspective the parts shown in section in Fig. 12. Fig. 14 is a longitudinal section of the feed-roll. Fig. 14ª indicates the means of varying the feed. Figs. 15 and 15ª indicate the means of operating the printing-platen. Fig. 16 shows the key by which the register is set to clip off the printed check or leave it unclipped. Fig. 17 is a sectional elevation of another form of printing device embodying my present improvements. Fig. 18 indicates the means of operating the paper-feed, the printing, and the cutting-off knives of Fig. 17. Fig. 19 is an enlarged detail of the printing-platen and cutting-off knives of Fig. 17. Figs. 20 and 21 are rear and front views of the printing mechanism of Fig. 17. Figs. 22, 23, and 24 show in cross-section the relative positions of the key, the lower end of the tablet-rod, and the dog at several points in the movement of these parts.

In the specific form in which the above-mentioned objects are carried out there are provided a series of tablet indicator-rods carrying racks for differentially actuating the register, the proper tablet-rods being selected under the control of appropriate series of keys and subsequently actuated by means of an oscillating till-cover, which is moved by hand to expose the cash-receptacle. The tablet-rods also effect the positioning of printing-wheels, from which an impression is taken on a paper strip by means under the control of a spring-tensioned shaft, the spring of which is put under tension by the hand-operated till-cover, and this same shaft also controls the feed for the paper strip and the knife for severing the strip when it is desired to issue a check. There is also a device for varying the length of feed of the strip and for enabling or disabling the knife mechanism at will.

The specific parts of the mechanism will now be described with reference to said drawings.

A is the side of the case.

B represents the keys, the setting ends thereof being indicated at $b$, and B' is the universal bar on which the keys are pivoted.

C C represent lifting-dogs, corresponding in number and location to the keys mounted on the universal shaft $c$. A feather $c'$ in the shaft limits the rotary movement of the lifting-dogs thereon, said feather working in a slot C' in each dog. Each of the dogs is provided with a recess $C^2$, into which may pass the setting end $b$ of the corresponding key, as shown in Fig. 22. Each of the dogs is also provided with an arm C³, which when the dog is rotated will be brought into position to engage beneath a tablet-rod P to elevate the latter when the universal shaft c is elevated. All of the arms C³ of the dogs normally engage a resetting-bar C⁵, by which they are maintained out of the path of the tablet-rods. It will be observed that when any one of the keys is depressed its setting end will engage beneath the resetting-bar C⁵, being thus introduced within the recess C² of its corresponding dog. If now the universal shaft c is elevated, the selected dog will be partially rotated by the engagement with the setting end of the depressed key, as shown in Fig. 23, bringing the arm C³ beneath the corresponding tablet-rod P, which will be then elevated by the further upward movement. All the other dogs will not be rotated, and their arms C³ will pass clear of the corresponding tablet-rods. Movement of the universal shaft c is effected through connections with two slides D, one on each side of the machine, capable of vertical movement between the guides d d.

D' represents lifting-levers, hinged at D² to each end of the case and connected by links D³ to the corresponding circular rotative ends E of the money-box cover. The links D³ are each connected to the corresponding end E by pins d', so placed that when the ends E of the money-box cover are rotated around their central bearings G, so as to expose the money-box, the pins d' will be moved vertically over or slightly beyond said center. The object of this arrangement is to reduce the lifting motion of the links D³ to a minimum at this point, and inasmuch as the entire rotary motion of the ends E is about ninety degrees the lifting motion on the tablet-rods will be a gradually-decreasing one from the commencement of the operation and may be made to actually cease before the money-box cover is fully opened. In this way I effectively prevent overthrow of the tablet-rods and of any other mechanism which may be connected to the cover of the money-box. By this means a speed-reducing connection is provided by which a substantially constant movement of the manually-operated device is translated into a decreasing movement of the part to be moved, whereby to prevent overthrow, this decreasing movement gradually and continuously decreasing to a nullity without any abrupt changes in the speed thereof.

F F are two bell-crank hangers mounted within the sides A on the shaft f, whereby they move in unison. Connecting these hangers at the angles thereof is a rod f', which extends directly under all of the keys B, so that the said rod will be operated upon the depression of any one of the keys. In order to return the rod f' to restore the key when the till-cover is moved, I provide the hangers F each with a stud f², as shown in Figs. 1 and 3, which will be engaged by a cam-surface on the corresponding end E of the till-cover. When, therefore, the till-cover is opened, the rod f' will be moved upward to restore to the normal position any one or more of the keys B which may have been depressed, but not until the rear end of such key has effected the setting of its corresponding lifting-dog. One of the hangers, as shown in Fig. 1, is provided with a wedge or cam-like extension F', which when the hanger is moved upon the opening of the cover will be forced between a disk h and the cover A to shift the disk laterally, carrying a fluted or pinion shaft M with it, for a purpose to be explained hereinafter. At one side of the machine is an arched rack R, provided with a deep notch r at each end. The corresponding circular end E carries a pawl R', mounted on a pin r' and moved normally to a position in line with the diameter of the rack R by means of a spring R². The pawl R' is allowed to resume its normal position whenever it is brought opposite to one of the broad teeth r when the till-cover is fully opened or fully closed. In opening the cover it will be observed that the pawl will trail over the teeth of the rack R, preventing return movement of the cover. When, however, the cover is fully opened, the pawl will be permitted to again resume its normal position and when the cover is closed will trail over the rack-teeth in the opposite direction, compelling the full closing movement of the cover. This is an ordinary full-stroke mechanism, and I do not claim the same herein.

At either extreme of its travel the money-box cover is caught and locked by devices which hold it in either an open or closed position until it is unlocked by a subsequent action of the operator. When opened, a spring-bolt L (see Fig. 4) engages a lug l, carried by one of the ends E for the cover to lock the cover in its open position. The bolt L may be carried on any stationary part of the apparatus—as, for instance, the till H. The cover will be locked in an open position until the bolt L is withdrawn by any appropriate means. One convenient way of withdrawing the bolt out of locking engagement with the lug l is shown in Fig. 4, in which the bolt L is secured to the money-box by two pins working in oblique slots in the bolt, a spring l' holding the bolt in its forward or locking position. By depressing the bolt L at any point on its length the engagement between the oblique slots and the pins will cause it to be withdrawn from the lug l to permit the cover to be closed by any suitably-arranged closing-spring, as the spring N. The cover is locked in its closed position by means of a catch K on one of the ends E, which catch engages a hook k on the adjacent side A. By depressing the hook $k$ the cover will be unlocked. This may be effected by engaging the hook by means of the extension $F^3$ of the hanger F at that side of the machine. Upon the depression of any key the rod $f'$ will be lowered, carrying both of the hangers, and thus unlocking the money-box cover, which can then be opened.

When a printing or embossing mechanism is employed, as is preferable, a rod $n$ is mounted between the sides A A and is provided thereon with a coiled spring N, which tends to maintain the shaft $n$ in a normal position, but to permit rotation of the shaft under the influence of the money-box cover or of any other suitable manually-operated part. Said shaft is also provided with a small winding-drum thereon, around which is wound a chain $n'$, connected at its lower end with a drum $g$ on the pivot G of one of the ends of the money-box cover. When the cover is opened, the drum $g$ will be turned, winding the chain $n'$ thereon and rotating the shaft $n$ against the tension of the spring N. When the cover is closed, the spring N will rotate the shaft $n$ in the opposite direction. Obviously the spring N may be made of sufficient tension to effect the closing of the money-box cover through the chains $n'$.

Each of the tablet-rods is provided with a rack thereon, as shown clearly in Figs. 1 and 5, adapted to engage the teeth of the fluted shaft M when any of the tablet-rods is elevated. The racks which are formed on the tablet-rods are of varying extents, the tablet-rod corresponding to the one-cent key being provided with only one tooth, that for the two-cent key with two teeth, for the five-cent key with five teeth, and so on, whereby the fluted shaft M will partake of a movement corresponding to the particular tablet-rod which may be elevated. The fluted shaft M, as shown in Fig. 6, is divided into several sections, corresponding in number to the banks of the keys which are used. With the machine illustrated in the drawings there are four banks of keys, representing units, tens, hundreds, and any desired character-keys which may be employed. Referring to Fig. 7, it will be observed that one of the banks represents cents, the second dimes, the third dollars, and the fourth five character-keys, designated, respectively, "Ch.," (change,) "Cr.," (credit,) "Pd.," (paid,) "Rd.," (received,) and "St.," (stamps.) It is obvious that these latter keys may be changed to suit the conditions in which the cash-register is to be employed. When four banks of keys are thus used, the fluted or pinion shaft M will be divided into four sections, which I have designated, respectively, W $x$ Y Z, arranged in line, but independently movable with respect to each other. Preferably a printing or embossing mechanism is used, comprising in this instance four printing or embossing wheels or type-carriers (designated, respectively, $q'$, $q^2$, $q^3$, and $q^4$) corresponding in number with the banks of keys. Three of these wheels, representing units, ten, and hundreds, are provided with the nine digits and a naught thereon, while the other wheel is provided with characters corresponding to the keys in the character-bank. The units-keys select the tablet-rods which effect the varying rotation of the section W of the fluted or pinion shaft M. This section is connected by a shaft $w$ with the first printing-wheel $q'$. The section $x$ of the shaft which is operated through the tablet-rods corresponding to the keys of the second bank connects by a sleeve $x'$ with the second printing or embossing wheel $q^2$. The tablet-rods of the third bank, corresponding to keys representing hundreds or dollars, control the variable extents of movement of the section Y, which is connected by a sleeve $y$, surrounding the sleeve $x'$, with the third printing or embossing wheel $q^3$. The tablet-rods corresponding to the fourth bank of keys control the variable extents of movement of the section Z of the fluted shaft, which section is connected by the sleeve $z$ with the fourth printing or embossing wheel $q^4$, said sleeve $z$ surrounding the sleeve $y$. By employing the shaft $w$, connecting the section W with the printing-wheel $q'$, and the several concentric sleeves $x'$, $y$, and $z$, connecting the other sections with the respective printing or embossing wheels, substantial rigidity of the fluted shaft will be secured.

The register which may be used may be of any suitable type, but is preferably of the form which I describe in my Patent No. 484,814, dated October 25, 1892. I illustrate in Fig. 6 four wheels O, O', $O^2$, and $O^3$, which correspond to the four banks of keys and which may be provided on their peripheries with the proper and usual designating numbers and characters to constitute a register. Instead of providing these wheels with numbers or characters on their peripheries they may constitute the intermediate connecting-wheels for operating a series of register-disks, as I describe in my patent. Where reference is made in my claims to a "register" or "register mechanism" I mean to be understood as covering either a register consisting of a series of wheels or disks operated substantially directly, like the wheels O, O', $O^2$, and $O^3$, or indirectly. The wheels O, O', $O^2$, and $O^3$ are each provided with ratchet-teeth on their periphery, with which the pawls S, S', $S^2$, and $S^3$ engage to prevent return movement of the wheels. These pawls are carried on a stationary part of the register, as shown in Fig. 6, which parts may in addition constitute bearings for the several sections of the fluted shaft M. The sections of said shaft are provided with clutch members $o$, $o'$, $o^2$, and $o^3$, which are adapted to engage the ratchet-teeth of the wheels O O' O² O³ when the fluted shaft M as a whole is shifted. This shift of the shaft is effected, as I have already described, upon the opening movement of the money-box cover through the action of the wedge F' entering between the disk $h$ and the side A. Since the wheels O, O', O², and O³ are prevented from backward movement by the pawls S, S', S², and S³, as explained, the engagement of the wedge F' between the disk $h$ and the cover A to hold the clutch-sections $o\ o'\ o^2\ o^3$ in engagement with the wheels will result in the locking of any elevated tablet rod or rods in the elevated or exposed positions; but as soon as the wedge is withdrawn from this engagement the weight of the tablet-rods will return the sections of the fluted shaft to their normal positions, in which movement the engaging surfaces of the clutch-sections $o\ o'\ o^2\ o^3$ with the wheels O O' O² O³ will act as cams to return the shaft M as a whole to its normal position. The wedge F' is, as stated, forced into engagement with the disk $h$ to shift the shaft M upon the preliminary movement of the money-box cover. It will be observed that at all positions of the latter, except when wholly closed, the pin $f^2$ will engage with the edge of the corresponding disk E, thus positively holding the wedge F' in position and preventing the possibility of an exposed tablet descending. When the money-box cover is closed, the cut-away portion of the disk E will permit the wedge F' to be withdrawn; but this movement can only be effected upon the depression of a key, indicating a new transaction.

In the present instance two of the tablet-rods situated in the first bank, representing units, are provided with racks of the same number of teeth, these rods being represented in Fig. 7 at 5 and 5ª. Connected to the dog C corresponding to the latter tablet-rod is a five-cent bar V, extending parallel to the dogs in the adjacent bank. Each of the dogs of the tens-bank corresponding to the tablet-rods indicating odd multiples of five (in the present instance the fifteen, twenty-five, and thirty-five) is provided with a pin, as shown, which engages the five-cent bar V to operate the latter and effect in consequence the setting of the dog corresponding to the tablet-rod 5ª. The tablet-rod 5ª is not provided with a tablet, but is, as stated, provided with a rack having the same number of teeth as the tablet-rod corresponding to the five-cent key, said rack effecting a movement of the shaft-section W and the corresponding printing or embossing wheel $q'$ to both register and record five. The tablet-rod corresponding to the "15" key is provided with a tablet indicating fifteen, but with a rack which serves to actuate the register and the printing or embossing wheel to the same extent as the actuation of the ten-cent key. When the fifteen-cent key is depressed, however, the corresponding setting-dog C and also the setting-dog of the tablet-rod 5ª will be rotated by the subsequent action of the lifting-bar, the tablet "15" will be disclosed, and fifteen (ten plus five) will be registered and recorded by the combined action of the racks on the tablet-rods 15 and 5ª.

In order that the sections of the fluted or pinion-shaft M may normally occupy a position to be properly engaged by the several racks on the tablet-rods, I provide the projecting pins $t, t', t^2$, and $t^3$ on the several sections, which engage stop-pins $u\ u'\ u^2\ u^3$ on the stationary parts of the apparatus. Springs $s$ are preferably employed to effect a positive return of the shaft-sections when return movement thereof is permitted by the withdrawal of the wedge F'. When all the tablet-rods are at rest in their normal positions on the bar T, the pins $t$ and $u$ will be in engagement to hold the sections of the fluted shaft in their proper normal positions.

The recording portion of the machine or the means by which the amounts shown on the elevated tablets may at the same time be printed or embossed upon a ribbon or strip of paper is located outside of the main case, within a small auxiliary casing, as shown in Fig. 8. One construction of printing or embossing mechanism is shown particularly in Figs. 9, 10, 12, 13, 14, 14ª, 15, 15ª, and 16. A modification is illustrated in Figs. 17 to 21. As previously described, the several journals upon which the printing or embossing wheels $q', q^2, q^3$, and $q^4$ are mounted extend through the main case A, said wheels being external to the main case. The shaft $n$ also extends outside of the main case and supports on its end a feed-roll 101 and a disk 102, the former being loose on the shaft and the latter fast thereto. The disk 102 carries a pawl 103, which engages with a ratchet-wheel 104 on the feed-roll 101, whereby the feed-roll will be moved in one direction by the pawl 103, but will be prevented from return movement by a return-pawl. (Not shown.) The positive movement of the feed-roll will effect a feed movement of a strip of paper 105, supported within the auxiliary case and having its free end extended between the guide-rolls 106 107, over the platen 108, between the feed-roll 101 and a pressure-roll 109, and between the shearing-knives 110 and 111. To the case is hinged on any proper journal, as the shaft of the guide-roll 107, an arm carrying the printing or embossing platen 108, the face of the latter coming directly under the line of type on the printing or embossing wheels $q', q^2, q^3$, and $q^4$. When an inking-ribbon 121 is employed, a printing will be effected on the paper. When the inking-ribbon is dispensed with, the type will perform an embossing operation. The platen-arm 112 extends in front of the disk 102, and a pin 113, carried by said disk, is adapted to engage the platen-arm to elevate it to engage the paper with the embossing or printing wheels on preferably the positive stroke of the money-drawer cover.

It will be observed that when the till-cover is opened the shaft n will be rotated against the tension of the spring N, the rotation of said shaft causing the pin 113 to engage the platen-arm 112 near the completion of the movement. On the return movement of the cover the spring N returns the shaft n, withdrawing the pin 113 from the arm 112, whereby the latter will be permitted to descend. On this return movement the pawl 103 will engage the ratchet 104, effecting a positive movement of the feed-roll 101 to feed the paper forward. This movement, taking place when the cover is returning, occurs after the setting of the printing or embossing wheels and after the printing or embossing, both of which operations take place upon the opening movement of the cover. A lever 114 is pivoted to one of the side plates A and connects with and operates the shearing-knife 111. This lever is provided with a movable foot 115 at its lower end, which is adapted to be engaged by the money-box cover at the extreme end of the closing movement thereof, whereby the shear 111 will be moved relatively to the shear 110 to cut off the paper after the feeding movement has taken place. By turning the foot 115 to one side, as shown in Fig. 16, this engagement with the cover will not take place, and in consequence the ribbon will preserve its continuous form. In some instances this may be desirable. When the register is operated without cutting off the paper, it is usually desirable that the ribbon be fed more slowly to the printing-wheels, and to enable this to be done there is adjustably attached to the inside of the outer wall of the auxiliary case a mask 116, adapted to be raised, so as to hold the pawl 103 out of engagement with the ratchet-wheel 104 during a part of the rotation of the shaft n. In this way the feed movement of the feed-roll can be regulated at will. The mask 116 is held to the side of the casing by a thumb-nut 117, (see Fig. 8,) working in a slot 118, whereby adjustment of the mask 116 is secured. The inking-ribbon is controlled by the two thumb-nuts 119 and 120.

The modification of the printing or embossing mechanism shown in Figs. 17 to 21 will be readily understood. In this modification a feed-roll 11 is moved forward by a pinion 12, operated from a rack 13, connected to and moving with the shaft c. On the external end of the shaft carrying the pinion 12 is the feed-roll 11. A ratchet 14 drives the feed-roll during the positive stroke of the pinion and permits the feed-roll to remain stationary during the negative stroke thereof. A mask 17 may be employed to vary the feed movement of the feed-wheel, if desired. The paper 19 passes between the feed-roll 11 and a pressure-roll 18, thence between the two shearing-knives 24 and 26, and over the platen 21. One of the shearing-knives and the platen are carried on reciprocating frame 27, having a pin 28, which works in a slot. This frame is engaged by a pin 32 on one of the end plates E at the completion of the positive movement thereof. The lower end of the frame 27, which, as shown in Fig. 18, may be located on the inside of the plate A, is guided by the ears 29 and 31.

The essential difference between the printing or embossing mechanisms shown in Figs. 9, 10, 12, 13, 14, 14ª, 15, 15ª, and 16 and the mechanism shown in Figs. 17 to 21 is that with the former the setting of the printing or embossing wheels takes place upon the positive stroke of the till-cover, the printing or embossing is effected at the completion of the positive movement, the feed movement is effected during the closing movement, while the cutting off is effected at the end of the closing movement. With the latter arrangement, the setting of the printing or embossing wheels and the feed of the paper is effected upon the positive movement of the money-drawer cover, while the printing or embossing and the cutting off of the paper are simultaneously effected at the completion of the opening movement of the money-box cover. The construction shown in this modification, as above described in connection with Figs. 17 to 21, is not claimed herein, but is intended to form the subject-matter of claims in a divisional application.

There are several important features of this invention that I wish to emphasize. The depression of one of the keys B operates none of the mechanism except the included part of the key itself and the rod $f'$, which unclutches the shaft M, permitting an exposed tablet to drop and unlocking the money-drawer cover. In consequence a key may be returned to its normal position without causing a new indication or registry, thus permitting the correction of a mistake in depressing a key. The inner end of the key moves to position to mesh with a selected dog, which will be moved into position to engage the corresponding tablet-rod by the continuous movement of the till-cover. The elevation of the tablet-rods, as explained, due to the levers and links connected to the till-cover, is at first rapid; but as the tablet-rod reaches the upper part of its travel its speed is gradually decreased and finally ceases entirely before movement of the till-cover is arrested. This effectually prevents any tendency of the tablet-rods to overthrow by reason of inertia and prevents the shaft M and the printing or embossing wheels from overthrowing, while the continued movement of the till-cover, which takes place after the printing or embossing wheels have come to rest, may be utilized in effecting the printing or embossing operation and in severing the paper. The tablet-rods after they have been lifted to expose the tablets remain in an elevated position until another key has been depressed, that being the only possible way of unclutching the shaft M and permitting it to rotate backward to drop the tablet-rod. After the key has been depressed and the end $b$ thrown into mesh with its corresponding dog, it remains in mesh until the arm $C^3$ has come under the end of the tablet-rod P, when the dog is still further rotated as the slide rises, thus disengaging the dog from the key and permitting the latter to be returned to its normal position. The tablet-rods, with their racks, actuate both the recording and the registering mechanism, and as distinguished from the setting-key the lifting-bar and dogs may be termed the "recording-actuator" or "registering-actuator." The locking-hook K is provided with several short locking-teeth, each of which is adapted to engage with a locking-catch $k$. The depression of one of the keys B depresses the bar $f'$ and the arm $f^3$ unlocks the catch $k$ from the hook K and at the same time engages the inner end of the depressed key with the recess in the corresponding dog, and the till-cover will be free to be opened. If, however, the key could now be lifted, so that its inner end passes out of position to engage with the setting-dog and the cover remained unlocked, the till might be uncovered without raising the tablet-rods. To prevent this, the hook H, as stated, is provided with several short teeth, and if the operator having once depressed the key moves the cover slightly, but not enough to engage the inner end of the key with the setting-dog and then raises the key, the spring $k'$ at once lifts the catch $k$ into engagement with the second or third tooth of the hook K and prevents the further opening of the cover. The till-cover in the present case is utilized as a movable member which is moved at will to expose the money within the cash-receptacle; but it is of course to be understood that driving power may be supplied by the use of other well-known forms of cash-receptacles having a movable member which is operated at will to expose the money. In fact, in some of the claims the invention is intended to be broad enough in some of its aspects to include any suitable form of driving mechanism, hand-operated or otherwise. Another important feature of the invention is the spring-tensioned member or shaft $n$, and it is intended to claim this subject-matter, broadly, in connection with the control of the printing instrumentalities and the tensioning of said member or shaft by the operating device.

It is to be understood that when the words "indicator instrumentalities" are used in the claims these words are intended to be broad enough to cover within the scope of the invention the use of the tablet form of indicator as herein specifically adapted as one form of such indicator instrumentality, and also the well-known substitute form of rotary indicator, either form being adapted to variously expose a plurality of indicia.

What I claim is—

1. In a cash-register, the combination with a series of keys, of a series of indicators, a movable member for moving the indicators into exposed positions, a series of movable indicator-engaging devices carried by said movable member and adapted to be set by the keys to coöperate with their respective indicators, and means for operating the movable member.

2. In a cash-register, the combination with a series of indicators, of a movable member for moving the indicators into exposed positions, a series of movable indicator-engaging devices carried by said movable member, a series of keys arranged to be moved into the paths of the indicator-engaging devices so that when the movable member is operated said devices will be brought into engagement with their respective indicators and means for operating the movable member.

3. In a cash-register, the combination with sales-indicators normally inexposed, a lifting device for moving the indicators into exposed position, an actuator for moving the lifting device, and a key arranged to be engaged by the lifting device in its movement, whereby the latter will engage the indicator corresponding to the key to expose said indicator, substantially as set forth.

4. In a cash-register, the combination with an indicating mechanism, a series of keys, an operating-bar for said indicating mechanism provided with movable connections between it and the indicating mechanism, said connections being arranged to engage said keys and to be moved thereby into position to act upon said indicating mechanism when the bar is elevated, and means for operating said bar, substantially as set forth.

5. In a cash-register, the combination with a tablet-rod, of a key, a lifting-bar, and a movable dog on said lifting-bar adapted when the lifting-bar is elevated to intermesh with said key and to be moved thereby into position to engage with and lift said tablet-rod, substantially as and for the purpose described.

6. In a cash-register, the combination of a tablet-rod, a supporting-bar upon which said tablet-rod rests when in its lowermost position, a key extending to the outside of the case, a lifting-bar movable vertically, and a movable dog adapted to be supported by and moved with said lifting-bar and to be moved on said lifting-bar into position to intermesh with said key, and adapted to be moved by its mesh with said key into a position to lift said tablet-rods, substantially as and for the purpose described.

7. In a cash-register, the combination of a tablet-rod vertically movable, a lifting-bar vertically movable in a path parallel to the path of said tablet-rod, a movable dog on said lifting-bar, an arm or projection on said movable dog adapted to be moved into position to catch under and raise said tablet-rod, and a key extending through the walls of the case of said register, having an inner arm adapted to be brought into mesh with said movable dog and to move the same, and thereby move said arm into position to engage with said tablet-rod, substantially as and for the purpose described.

8. In a cash-register, the combination of a lifting-bar vertically movable, a key, a tablet-rod, a dog movable on said lifting-bar adapted to intermesh successively with said key and said tablet-rod and to pass out of mesh with said key by continued vertical movement with said tablet-rod, substantially as and for the purpose described.

9. In a cash-register, the combination of a tablet-rod, a lifting-bar movable vertically, a dog movable on said lifting-bar, an arm or projection from said dog adapted to engage with said tablet-rod and lift the same with the upward motion of said lifting-bar, and a stationary readjusting-bar adapted to throw said arm out of engaging position as the lifting-bar is dropped, substantially as and for the purpose described.

10. In a cash-register, the combination of a tablet-rod, a lifting-bar vertically movable and circular in cross-section, a setting-dog capable of rotary motion partially around said lifting-bar, a feather adapted to act as a stop in either direction, and a key normally out of contact with said dog, but adapted to move into position to mesh with and cause a partial rotation of said dog, and throw an arm extending from said dog into position to engage with and lift said tablet-rod, substantially as and for the purpose described.

11. In a cash-register, in combination with a tablet-rod, a lifting-bar, means for lifting said bar in a path parallel to the axis of said tablet-rod, an arm movable on said lifting-bar, means for turning said arm outward from said bar, into position to engage with and lift said tablet-rod, when the bar is elevated substantially as described.

12. In a cash-register, a series of tablet-rods adapted to move vertically, a horizontal bar parallel with the line of tablet-rods, arms movable upon said bar, and adapted to be turned thereon into position to engage with said tablet-rods, when the bar is elevated, and means for elevating said bar, substantially as specified.

13. In a cash-register, the combination of a tablet-rod, a key, a lifting-bar, a movable dog on said lifting-bar, adapted when lifted to engage said key and to be moved thereby into position to engage with and lift said tablet-rod, substantially as set forth.

14. In a cash-register, the combination of a tablet-rod, a lifting-bar movable vertically, a dog movable with and on said lifting-bar, an arm or projection from said dog, adapted when elevated to engage with said tablet-rod and lift the same, and means for moving said arm out of engaging position effected by the dropping movement of said lifting-bar, substantially as described.

15. In a cash-register, the combination with a tablet-rod provided with a rack, a pinion adapted to mesh with said rack, a register mechanism, the said pinion being movable axially into clutch with said registering mechanism, and means substantially such as described for giving axial movement to said pinion.

16. In a cash-register, in combination with a series of tablet-rods, each of which is provided with a rack, a pinion common to all the tablet-rods of said series, movable longitudinally along its axis and normally free to rotate in either direction, a clutch adapted to engage with said pinion and to be brought into clutching engagement by such longitudinal movement, and means for moving the pinion axially, substantially as and for the purpose specified.

17. In a cash-register, the combination with a series of tablet-rods, each provided with a rack, a pinion common to all rods of said series, free to rotate in either direction and movable axially into engagement with a clutch, and a clutch adapted to engage with said pinion and prevent backward rotation of said pinion, substantially as and for the purpose described.

18. In a cash-register, the combination of a cash-recording pinion, a pinion movable endwise in its bearings, a clutch mechanism adapted to engage said pinion when moved endwise, tablet-rods provided with racks and adapted to mesh with said pinion, and a wedge adapted to enter between the end of said pinion and its bearing and force it endwise, substantially as and for the purpose described.

19. In a cash-register, the combination with a pinion and its bearings, of a clutch mechanism adapted to engage with said pinion, a tablet-rod provided with a rack and adapted to mesh with said pinion, a swinging wedge adapted to force the pinion and clutch into engagement, and a key extending through the walls of the inclosing case, adapted to move said wedge out of engagement between the pinion and its clutch, substantially as and for the purpose described.

20. In a cash-register, the combination of a case, an inclosed till, a till-cover forming part of said case and having a rotary movement in opening and closing, a tablet-rod provided with a rack, a pinion rotatable in either direction, a clutch adapted to prevent backward rotary motion of said pinion, a lever interposed between said pinion and said till-cover and actuated by said till-cover, and adapted to force said pinion into engagement with the holding-clutch, substantially as and for the purpose described.

21. In a cash-register, two or more pinions adapted to rotate backward and forward, two or more registering-wheels adapted to rotate forward only, a clutch connection between each of said pinions and its proper registering-wheel, and mechanism operated by a moving part of the machine for simultaneously engaging and positively locking together all of said pinions and their proper registering-wheels, substantially as set forth.

22. In a cash-register, the combination with a pinion and its bearings, clutch mechanism adapted to engage with said pinion, means for rotating said pinion, a wedge adapted to force the parts of said clutch into engagement, and a key adapted to move said wedge and disengage the parts of said clutch, substantially as described.

23. In a cash-register, in combination with a pinion, a tablet-rod adapted to actuate said pinion, register-wheels axially concentric to said pinion and adapted to be clutched with said pinion by endwise movement of the same, substantially as and for the purpose described.

24. In a cash-register, in combination with a pinion and tablet-rods provided with racks adapted to actuate said pinion, stops located on said pinion and on the supporting-case, to hold said pinion normally in position to be engaged by said rack arranged to prevent more than a single revolution of said pinion, and a retracting-spring, substantially as and for the purpose described.

25. In a cash-register, the combination of a pinion movable axially, register-actuating wheels axially concentric with said pinion, a clutch between said pinion and the register-actuating wheels, a spring-detent adapted to prevent backward movement of said register-actuating wheels, an actuating-lever adapted to move the parts into clutch, and means for rotating said pinion backward and out of clutch when released from said actuating-lever, substantially as and for the purpose specified.

26. In a cash-indicator, the combination with indicating mechanism, of a manually-operated part moving such mechanism, and a speed-varying connection between said indicating mechanism and the manually-operated part acting to translate a constant movement of the manually-operated part into a movement of the indicating mechanism which continuously and gradually decreases to a nullity without abrupt changes in the speed thereof, whereby movement of the indicating mechanism will cease before that of the manually-operated part so as to prevent overthrow of the indicating mechanism, substantially as set forth.

27. In a cash-indicator, the combination with indicating mechanism, of a manually-operated part moving said indicating mechanism, and a speed-varying connection between said indicating mechanism and said manually-operated part having as one of its elements a connecting-link which passes over a center of rotation as the manually-operated part reaches the end of its movement to arrest movement of the indicating mechanism, whereby a constant speed of said manually-operated part will be translated into a gradually-decreasing speed of said indicating mechanism, and the overthrow of the indicating mechanism will be prevented, substantially as set forth.

28. In a cash-indicator, the combination with movable tablet-rods, of keys controlling and selecting the tablet-rods to be moved, and an actuator for moving the tablet-rods having a gradually-decreasing speed toward the end of its movement whereby movement of the tablet-rod toward indicating position ceases before that of the actuator, substantially as set forth.

29. In a cash-indicator, the combination with movable tablet-rods, of keys controlling and selecting the tablet-rods to be moved, a lifting-bar for moving the tablet-rods which are selected by the keys, a manually-operated part for moving said lifting-bar, and a speed-varying connection between said lifting-bar and the manually-operated part acting to translate a constant movement of the manually-operated part into a gradually-decreasing movement of the lifting-bar whereby movement of the tablet-rods toward indicating position will cease before that of the lifting-bar, substantially as set forth.

30. In a cash-register, the combination with the registering mechanism, of a manually-operated part moving said register, and a speed-varying connection between said register and the manually-operated part acting to translate a constant movement of the manually-operated part into a movement of the register, which continuously and gradually decreases to a nullity without abrupt changes in the speed thereof, whereby overthrow of the register-wheels is prevented, substantially as set forth.

31. In a cash-register, the combination with the registering mechanism, of a manually-operated part moving said register, and a speed-varying connection between said register and said manually-operated part having as one of its elements a connecting-link which passes over a center of rotation as the manually-operated part reaches the end of its movement, whereby a constant speed of said manually-operated part will be translated into a gradually-decreasing speed of said register and the overthrow of the register will be prevented, substantially as set forth.

32. In a cash-register, the combination with the registering mechanism, of movable tablet-rods engaging said register and moving it, a manually-operated part for moving said tablet-rods, and a speed-varying connection between said tablet-rods and the manually-operated part acting to translate a constant speed of the manually-operated part into a gradually-decreasing speed of the tablet-rods, whereby the overthrow of the register-wheels will be prevented, substantially as set forth.

33. In a cash-register, the combination with sales-indicators, of an operating device therefor, a rotatable till-cover, a system of links connected between said operating device and said till-cover, the pin connecting said links and said till-cover being located on a diameter thereof that is approximately horizontal when said till-cover is closed, whereby the opening of said till-cover imparts a rapid initial motion and a slow final motion to said operating device, substantially as and for the purpose described.

34. In a cash-register, the combination with a device for operating the register mechanism, of a till-cover or lever, a system of links connecting said till-cover and said device, the pin connecting said links and said till-cover being located on a diameter thereof that is horizontal when said till-cover is closed, whereby the opening of said till-cover imparts, from a constant motion of said till-cover, a rapid initial motion to said lifting-bar, and a slow final motion, substantially as and for the purpose described.

35. In a cash-register, the combination of a till-cover having a circular rotary end, a lifting-bar having a vertical movement, a system of links between the end of said till-cover and said lifting-bar, a wrist-pin connecting one of said links to the rotary end of said cover on a diameter of said till-cover that is horizontal when said till-cover is closed, whereby a constant rotary motion of said till-cover produces a rapid initial motion of said lifting-bar and a slow final motion, whereby the tendency of said lifting-bar and tablet-rods lifted thereby to "overthrow" is prevented, substantially as and for the purpose described.

36. In a cash-register, the combination of the rotary end E of the till-cover, the lifting-bar C, and the connecting-links D, D', D³, said link D having a vertical movement, and link D' having an angular movement, and said link D³ having a rotary movement, on the wrist-pin d', and circular movement at its point of attachment with link D', the said wrist-pin d' being located on a diameter of said end e that is horizontal when the till-cover is closed, substantially as and for the purpose described.

37. In a cash-register, the combination with a printing or embossing mechanism, a manually-operated part for moving said mechanism, and a speed-varying connection between said mechanism and the manually-operated part, acting to translate a constant movement of the manually-operated part, to a movement of said mechanism which continuously and gradually decreases to a nullity without abrupt changes in the speed thereof, whereby overthrow of the printing or embossing mechanism is prevented, substantially as set forth.

38. In a cash-register, the combination with a printing or embossing mechanism, of a cash-receptacle, having a movable part or member, and a speed-varying connection between said mechanism and the movable part, acting to translate a constant movement of the movable part into a movement of the printing or embossing mechanism, which continuously and gradually decreases to a nullity without abrupt changes in the speed thereof, whereby overthrow thereof is prevented, substantially as set forth.

39. In a cash-receptacle, the combination with a money-receptacle, of independent latches, one for holding the receptacle in its extreme open position and the other for holding the receptacle in a closed condition and independent devices for operating the respective latches at will.

40. In a cash-register, the combination with a money-receptacle, of independent latches one for holding the receptacle in an open condition and the other for holding the receptacle in a closed condition, a spring for closing the receptacle and independent devices for operating the respective latches.

41. In a cash-register, the combination with a money-receptacle, of a latch adapted to hold said receptacle open, a spring for closing it, an automatic catch adapted to lock it in its closed position, register-keys, and means adapted to be actuated by any one of the register-keys for unlocking said last-mentioned catch, substantially as described.

42. In a cash-register, the combination with a money-receptacle, of means for locking the same closed, finger-keys, each of which is severally adapted to unlock said receptacle when closed, and a locking-bar adapted to lock the receptacle when open, said locking-bar being a spring-actuated horizontal bar adapted to move both vertically and horizontally into locking engagement, and horizontally and vertically out of locking engagement, substantially as described.

43. In a cash-register, in combination with an inclosing case, an arched till-cover rotating on a central bearing, a locking-bolt for holding said cover in its open position, consisting of a horizontal bar with diagonal slots and slidingly secured to said case by means of pins passing through said slots, whereby both vertical and horizontal motion of said bar are produced by a vertical motion, substantially as and for the purpose described.

44. In a cash-register, in combination with tablet-rods and a lifting-bar, of a dog moving with and movable on said lifting-bar, a key arranged to engage with said dog and move it into position to engage with and lift said tablet-rods, a lever adapted to actuate said lifting-bar, means for actuating said lever, a self-setting lock adapted to prevent the action of said lever, and a key-lever adapted to release said lock, substantially as and for the purpose described.

45. In a cash-register, the combination of the inclosing case, the arched till-cover rotating on a central bearing, the locking-bolt L, held to said case by means of pins and the described diagonal slots, and adapted to lock the cover in its open position, substantially as and for the purpose described.

46. In a cash-register, the combination with an arched till-cover rotating on a central bearing, of a locking-hook $k$ on the register-case, a locking-catch K on the till-cover, the swinging bar $f'$ and depending arm $F^3$ adapted to be operated by the key B and to throw the locking-hook $k$ and the locking-catch K out of engagement, substantially as and for the purpose described.

47. In a cash-register, the combination with a money-receptacle having a removable cover provided with a handle, of a latch adapted to hold said cover in its open position, a spring adapted to close said cover, a lock adapted to hold said cover in its closed position, register-keys, means adapted to be operated by any of the register-keys for unlocking said last-mentioned latch, and a complete throw mechanism whereby said cover is prevented from having backward movement after starting to either open or close, substantially as and for the purpose specified.

48. In a cash-register, the combination with a money-receptacle, of a latch adapted to hold said receptacle open, a spring for closing it, an automatic catch adapted to lock in its closed position, register-keys, means adapted to be actuated by any of the register-keys for unlocking said last-mentioned catch, and a complete throw mechanism whereby a backward movement either in opening or closing said receptacle is prevented until a complete throw has been made, substantially as described.

49. In a cash-register, the combination with a series of keys, of a registering mechansm, a cash-receptacle having a movable part for operating the registering mechanism, a latch for holding the movable part of the cash-receptacle closed adapted to be operated by said keys, and means mounted on the movable part and engaged by said latch whereby the opening of said part is prevented unless a key is operated and remains in operated position.

50. A cash-register including a cash-receptacle, a movable part for said receptacle, a latch for the movable part and means for preventing the opening of the movable part unless the latch is held tripped during a portion of the opening movement of the movable part.

51. In a cash-register, a series of register-operating rods, an actuator for the rods, a series of intermediate elements for connecting the actuator with the rods, and a five-cent bar for connecting certain of the intermediate elements with the intermediate element connecting the actuator and five-cent register-rod, substantially as described.

52. In a cash-register, in combination with a registering mechanism, a series of keys, a series of register-actuating elements arranged to be selected by said keys but operatively actuated independently of the movement of said keys, and a five-cent bar arranged to connect certain of said actuating elements with the element effecting the registration of five-cent amounts, substantially as described.

53. In a cash-register, in combination with a suitable registering mechanism, a series of keys arranged to effect the registration of five-cent amounts and multiples thereof, a series of register-actuating elements arranged to be selected by said keys but operatively actuated independently of the movement of said keys, and a five-cent bar arranged to connect the five-cent-actuating element with the actuating elements for the odd multiples of five cents, substantially as described.

54. In a cash-register registering amounts of five cents and multiples thereof, the combination with a suitable registering mechanism, of a series of keys, a series of register-actuators arranged to be selected by said keys but operatively actuated independently of the movement of said keys, and a five-cent bar arranged to effect the registration of a five-cent amount and an even multiple thereof by the operation of a key representing an odd multiple of five above the first power, substantially as described.

55. In a cash-register for registering five-cent amounts and multiples thereof, the combination of a suitable registering mechanism, of a series of keys, a series of register-actuators, an actuating-bar for said actuators, a series of connecting elements mounted upon said actuating-bar arranged to operatively engage said actuators and said bar, and a five-cent bar arranged to connect the connecting element between the five-cent actuator and the actuator-bar with the connecting elements between the bar and the actuators representing amounts which are odd multiples of five above the first power, substantially as described.

56. In a cash-register, the combination of a five-cent register-wheel, a ten-cent register-wheel, a series of keys indicating both even and odd multiples of five above the first power, separate actuators for said wheels operating independently of the movement of said keys, and a five-cent bar between the actuating mechanism of the ten-cent wheel and the five-cent wheel, whereby the operation of any one of said keys secures the registration of the tens of its value on the ten-cent wheel and the five on the five-cent wheel, substantially as described.

57. In a cash-register, the combination of a five-cent register-wheel, a ten-cent register-wheel, a series of keys indicating both even and odd multiples of five above the first power, separate actuators for said wheels operated independently of the movement of said keys, and a five-cent bar between the actuating mechanism of the ten-cent wheel and the five-cent wheel, whereby the operation of any one of said keys indicating odd multiples of five secures the registration of the tens of its value on the ten-cent wheel and the five on the five-cent wheel, substantially as described.

58. In a cash-register, the combination of a five-cent register-wheel, a ten-cent register-wheel, a series of keys indicating odd multiples of five above the first power, separate actuators for said wheels operated independently of the movement of said keys, and a five-cent bar between the actuating mechanism of the ten-cent wheel and the five-cent wheel, whereby the operation of any one of said keys secures the registration of the tens of its value on the ten-cent wheel and the five-cent wheel, substantially as described.

59. In a cash-register, the combination with a printing or embossing mechanism and a single tape or strip on which an impression is made, of a cash-receptacle having a movable part or member, and means operated by the movable part of said receptacle for setting the printing or embossing mechanism, substantially as set forth.

60. In a cash-register, the combination with a printing or embossing mechanism, of a cash-receptacle having a movable part or member, and means operated by the movable part of said receptacle for setting and operating the printing or embossing mechanism, substantially as set forth.

61. In a cash-register, the combination with a printing or embossing mechanism, of a cash-receptacle having a movable part or member, means for setting said mechanism, controlled by the opening movement of the movable part of said cash-receptacle, and mechanism for effecting the printing or embossing action of said printing or embossing mechanism, controlled by the opening movement and effected at the end of such movement, substantially as set forth.

62. In a cash-register, the combination with a printing or embossing mechanism and a paper-feeding mechanism, of a cash-receptacle having a movable part or member, means for setting the printing or embossing mechanism, controlled by the opening movement of the movable part of said receptacle, mechanism for operating said printing or embossing mechanism, and controlled by the opening movement and effected at the end of such movement, and means for operating the paper-feeding mechanism, and controlled by the closing movement of the movable part of said receptacle, substantially as set forth.

63. In a cash-register, the combination with a printing or embossing mechanism and a paper-feeding mechanism, of a cash-receptacle having a movable part or member, means for setting the printing or embossing mechanism, means operated by the movable part of the cash-receptacle for operating said printing or embossing mechanism, and means for operating the paper-feeding mechanism controlled by the closing movement of the movable part of said receptacle, substantially as described.

64. In a cash-register, the combination with a printing or embossing mechanism and a paper-feeding mechanism, of a cash-receptacle having a movable part or member, means for setting the printing or embossing mechanism, means operated by the movable part of the cash-receptacle for operating said printing or embossing mechanism, means for operating the paper-feeding mechanism, and controlled by the closing movement of the movable part of said receptacle, and mechanism for cutting off checks from the paper strip, and operated directly by the movable part of said receptacle, substantially as set forth.

65. In a cash-register, the combination with a printing or embossing mechanism and a paper-feeding mechanism, of a cash-receptacle having a movable part or member, means for setting the printing or embossing mechanism, controlled by the opening movement of the movable part of said receptacle, mechanism for operating said printing or embossing mechanism, and controlled by the opening movement of the movable part and effected at the end of such movement, means for operating the paper-feeding mechanism, and controlled by the closing movement of the movable part of said receptacle, and mechanism operated directly by the movable part of said receptacle for cutting off checks from the paper strip, substantially as set forth.

66. In a cash-register, the combination with a printing or embossing mechanism and a paper-feeding mechanism, of a cash-receptacle having a movable part or member, means for setting the printing or embossing mechanism, means operated by the movable part of the cash-receptacle for operating said printing or embossing mechanism, means for operating the paper-feeding mechanism, and mechanism for cutting off checks from the paper strip operated directly by the movable part of said receptacle, substantially as described.

67. In a cash-register the combination with a cash-safe having a part movable to expose the cash at will, of a series of type-carriers, a series of oscillatory members connected to the type-carriers so that when moved in one direction they will set the carriers, and when moved in the opposite direction will return the same to their normal positions and means intermediate the movable part of the cash-safe and the oscillatory members for moving the latter positively in one direction for changing the positions of the types.

68. In a cash-register the combination with a cash-safe having a part movable to expose the cash at will, of a series of type-carriers, a series of keys, a series of oscillatory members connected to the type-carriers and controlled in their movements in one direction by said keys, so that when moved in one direction they will set the type-carriers according to the values of the keys operated, and when moved in the opposite direction will return said carriers to normal positions and means intermediate the movable part of the cash-safe and the oscillatory members for moving the latter positively in one direction for changing the positions of the types.

69. In a cash-register the combination with a cash-safe having a part movable to expose the cash at will, of a series of type-carriers, a series of oscillatory members connected to said type-carriers, means intermediate the movable part of the cash-safe and the oscillatory members for moving the latter positively in one direction and devices governed by said movable part of the cash-safe for controlling the movements of the oscillatory members in the opposite direction.

70. In a cash-register the combination with a cash-safe having a part movable to expose the cash at will, of a series of type-carriers, a series of oscillatory members connected to said type-carriers, means intermediate the movable member of the cash-safe and the members for moving the latter positively in one direction, means for securing the members against movement in the opposite direction and devices governed by said movable part for controlling said securing means and the movement of the members in the opposite direction.

71. In a cash-register the combination with a cash-safe having a part movable to expose the cash at will, of a series of movable members, a series of indicators connected to said members, means intermediate the movable part of the cash-safe and the movable members for controlling the latter, a latch for holding the indicators in their set positions, a latch for the movable part of the cash-safe and a common means for operating said latches; the construction being such that the indicators may return to their normal positions independently of the operation of the movable part of the cash-safe.

72. In a cash-register the combination with a series of controlling elements, of a series of indicators connected thereto, a cash-safe having a part movable to expose the cash at will, means intermediate the controlling elements and the movable part of the cash-safe for controlling the movements of the elements to set the indicators, means for latching the indicators in their set positions and devices for tripping the said latches to allow the indicators to return independently of the operation of the movable part of the cash-safe.

73. In a cash-register the combination with a counter, of type-carriers, a common means for operating the counter and setting the type-carriers, a cash-receptacle arranged to be exposed at will, means dependent upon the full exposure of the receptacle for controlling the movements of the common operating means and impression devices dependent upon the full exposure of the cash-receptacle for operation.

74. In a printing mechanism of a cash-register, the combination of a feed-wheel, the clipping-shears 110 and 111, closing-lever 114, actuating end E of the till-cover, and the key 115 adapted to be interposed between the end E of the till-cover and the lever 114 and cause the till-cover to actuate the said lever, substantially as and for the purpose described.

75. In the printing mechanism of a cash-register, the combination of the movable till-cover, rotary rod $n$ carrying the fixed disk 102, the printing-wheels, printing-platen having an arm 112, pin 113 fixed in the disk 102, adapted to raise said platen-arm and force said platen against the printing-wheel, and means for actuating said rod $n$ by the movement of the till-cover, substantially as and for the purpose described.

76. In a cash-register, in combination with a till-cover having a rotary movement, a winding-drum at the axis of rotation, a rotary arbor carrying crank-pin, a winding-chain between said drum and said rotary arbor, a recovering-spring adapted to be placed under tension by the rotation of said arbor printing-wheels, and a printing-platen actuated by said crank-pin, substantially as and for the purpose described.

77. In a cash-register, the combination of a movable till-cover, an arbor supported by the case of said register and actuated by the movement of the till-cover, a disk secured to said arbor, a feed-roller journaled on said arbor, a ratchet-wheel and pawl connecting the said disk and feed-roll, and a mask adapted to regulate the engagement between the ratchet-wheel and pawl, substantially as and for the purpose described.

78. In a cash-register, the combination of a movable till-cover, an arbor supported by the case of said register and actuated by the movement of the till-cover, a disk secured to said arbor, a feed-roll journaled on said arbor, a ratchet-wheel and pawl connecting the said disk and feed-roll, and an adjustable mask adapted to regulate the engagement between the ratchet-wheels and pawl, substantially as and for the purpose described.

79. In a cash-register, the combination with a printing mechanism, of a paper-feed-actuating pawl having a uniform length of stroke at each operation of the machine; and means for holding the pawl out of operation throughout any desired extent of such uniform movement.

80. In a cash-register, the combination with a cash-safe having a member movable to expose the cash at will, of printing devices; a pivoted platen coöperating therewith; a revoluble operating-disk connected with said movable cash-safe member arranged to be rotated forward and backward by the opening and closing movements of said member; and means operated by said revoluble disk for striking said pivoted platen and forcing the same against said printing devices.

81. In a cash-register, the combination with a cash-safe having a member movable to expose the cash at will, of printing devices; a revoluble operating-disk connected with said movable cash-safe member arranged to be rotated forward and backward by the opening and closing movements of said member; and a paper-feed device having a one-way connection with said revoluble disk whereby to operate said feed during one direction of rotation of said disk.

82. In a cash-register, the combination with a cash-safe having a member movable to expose the cash at will, of printing devices; a revoluble operating-disk connected with said movable cash-safe member arranged to be rotated forward and backward by the opening and closing movements of said member; and a ratchet and pawl paper-feed device comprising a pawl carried upon said revoluble disk and engaging a notched wheel connected with said paper-feed device whereby the feed will take place in only one direction of movement of said movable cash-safe member.

83. In a cash-register, the combination with a cash-safe having a member movable to expose the cash at will, of printing devices; a revoluble operating-disk connected with said movable cash-safe member arranged to be rotated forward and backward by the opening and closing movements of said member; a pivoted platen for taking an impression from said printing devices; means connected with said revoluble disk for striking against said platen for forcing the same against said printing devices; and a paper-feeding device having a one-way ratchet connection with said revoluble disk so as to be operated in only one direction of movement of said movable cash-safe member, and said feeding device also being constructed to be actuated by said disk subsequent to the actuation of said platen.

84. In a cash-register, the combination with a cash-safe having a member movable to expose the cash at will, of a series of oscillatory type-carriers; a series of keys for predetermining the setting positions of said type-carriers; a series of oscillatory members connected to said type-carriers so that when moved in one direction they will set the carriers and when moved in the opposite direction they will return the carriers to normal position; means intermediate the movable cash-safe member and the said oscillatory members for controlling the movements of the latter to setting position; a revoluble operating-disk connected with said movable cash-safe member and oscillated forward and backward with the opening and closing movements of said cash-safe member; a pivoted platen; means connected with said revoluble disk for forcing said platen against said type-carriers subsequent to the setting movement of the type-carriers under the control of said movable cash-safe member; a paper-feed mechanism, and an actuating-pawl connected with said revoluble disk and coöperating with said paper-feed mechanism to actuate a paper-feed in only one direction of revolution of said disk and subsequently to the movement of said platen by said disk.

85. In a cash-register, the combination with a cash-safe having a part movable to expose the cash at will, of a series of movable members, and a series of indicator instrumentalities one for each of said members and each adapted to variously expose a plurality of indicia; means intermediate the movable part of the cash-safe and the movable members for controlling the latter; latching devices for holding said indicator instrumentalities in their set positions; a latch for the movable part of the cash-safe; a common means for operating said latches, the construction being such that the indicator instrumentalities may return to normal positions independently of the operation of the movable part of the cash-safe; and means operated by said movable part of the cash-safe for positively restoring the indicator-latching devices to latching condition.

86. In a cash-register, the combination with a cash-safe having a part movable to expose the cash at will, of a series of oscillatory members bearing on their periphery a plurality of transaction-indicia; means for predetermining the setting positions of said oscillatory members; means intermediate the movable part of the cash-safe and said oscillatory members for controlling the latter; latching devices for holding said oscillatory members in their set positions; a latch for the movable part of the cash-safe; and a common means for operating said latches, the construction being such that the oscillatory members may return to their normal positions independently of the operation of the movable part of the cash-safe.

87. In a cash-register, the combination with a cash-safe, having a movable part to expose the cash at will, of a series of oscillatory members bearing on their periphery a plurality of transaction-indicia; means for predetermining the setting positions of said oscillatory members; means intermediate the movable part of the cash-safe and said oscillatory members for controlling the latter; latching devices for holding said oscillatory members in their set positions; a latch for the movable part of the cash-safe; a common means for operating said latches, the construction being such that the oscillatory members may return to their normal positions independently of the operation of the movable part of the cash-safe; and means connected with said movable part of the cash-safe for positively restoring said latching devices for the oscillatory members to latching condition.

88. In a cash-register, the combination with a cash-safe having a movable part to expose the cash at will, of a series of movable members, and a series of indicator instrumentalities one for each member and each adapted to variously expose a plurality of indicia; means intermediate the movable part of the cash-safe and said movable members for controlling the latter; latching devices for holding said indicator instrumentalities in their set position; a latch for the movable part of the cash-safe; and a manipulative controlling device and means operated thereby for releasing the latch for said movable part and the indicator-latches at one and the same operation.

89. In a cash-register, the combination with a cash-safe having a movable part to expose the cash at will, of a series of oscillatory members bearing on their periphery a plurality of transaction-indicia; means for predetermining the setting positions of said oscillatory members; means intermediate the movable part of the cash-safe and said oscillatory members for controlling the latter; latching devices for holding said oscillatory members in their set positions; a latch for the movable part of the cash-safe; and a manipulative controlling device and means operated thereby for releasing the latch for said movable part and the latches for the oscillatory members at one and the same operation.

90. In a cash-register, the combination with a cash-safe having a movable part to expose the cash at will, of a series of oscillatory members bearing on their periphery a plurality of transaction-indicia; means for predetermining the setting position of said oscillatory members; means intermediate the movable part of the cash-safe and said oscillatory members for controlling the latter; latching devices for holding said oscillatory members in their set positions; means for releasing said latching devices to permit the oscillatory members to return to normal position; and means connected with said movable part of the cash-safe for positively restoring said latching devices for the oscillatory members to latching condition.

91. In a cash-register, the combination with a cash-safe having a movable part to expose the cash at will, of a series of oscillatory members bearing on their periphery a plurality of transaction-indicia; means for predetermining the setting positions of said oscillatory members; means intermediate the movable part of the cash-safe and said oscillatory members for controlling the latter; latching devices for holding said oscillatory members in their set positions; a latch for the movable part of the cash-safe; a manipulative controlling device and means operated thereby for releasing the drawer-latch and the latches for the oscillatory members at one and the same operation; and means connected with said movable part of the cash-safe for positively restoring said latching devices for the oscillatory members to latching condition.

92. In a cash-register the combination with a cash-safe having a part movable to expose the cash at will, of a series of type-carriers, means for controlling the degrees of movement of the type-carriers, means for positively moving the type-carriers by the movable part of the cash-safe in one direction and a series of keys for releasing said type-carriers to permit them to move in the opposite direction.

93. In a cash-register the combination with a cash-receptacle which may be exposed at will, of a series of oscillatory type-carriers, a series of oscillatory members connected to the type-carriers, a series of keys controlling the movements of said members and means for moving the members to set the type-carriers as an accompaniment to the exposure of the cash-receptacle.

94. In a cash-register the combination with a cash-receptacle arranged to be exposed at will, of a series of oscillatory type-carriers, a series of oscillatory members positively connected to said carriers for movement in both directions therewith, and means for moving the members to set the type-carriers as an accompaniment to the exposure of the cash-receptacle.

95. In a cash-register the combination with a cash-receptacle arranged to be exposed at will, of a series of oscillatory type-carriers, a series of indicators, a series of oscillatory members connected to the type-carriers and indicators for simultaneously operating the same, a series of key controlling the movements of the oscillatory members in one direction and means for operating said oscillatory members as an accompaniment to the exposure of the cash-receptacle.

96. The combination with a type-carrier and means for differentially adjusting the same to present different types to be printed; of a normally retracted platen, an oscillatory shaft controlling the operation of the platen, a spring for turning the shaft one way, and a manipulative operating member for turning the shaft the opposite way.

97. The combination with a type-carrier and means for differentially adjusting the same to present different types to be printed; of a normally retracted platen, an oscillatory shaft controlling the operation of the platen, a spring for turning the shaft one way, a manipulative operating member for turning the shaft the opposite way, and a latch for holding the shaft against turning by the spring with provisions for unlatching the shaft dependent upon the adjustment of the manipulative member.

98. The combination with a type-carrier and means for differentially adjusting the same to present different types to be printed; of a reciprocatory platen, an oscillatory shaft controlling the operation of the platen, a spring for turning the shaft one way, and a manipulative operating member for turning the shaft the opposite way.

99. The combination with a type-carrier and means for differentially adjusting the same to present different types to be printed; of a reciprocatory platen, an oscillatory shaft controlling the operation of the platen, a spring for turning the shaft one way, a manipulative operating member for turning the shaft the opposite way, and a latch for holding the shaft against turning by the spring with provisions for unlatching the shaft dependent upon the adjustment of the manipulative member.

100. In a cash-register the combination with printing mechanisms and means for differentially setting the same, of oscillatory impression-taking means therefor; rotary means controlling the movements of advancement and retraction of said impression means; a spring for actuating the means controlling movement of the impression means in one direction; and manipulative hand-operated devices for actuating the means controlling movement of the impression means in the reverse direction.

101. In a cash-register the combination with a type-carrier and keys controlling the differential adjustments of the same, of a pivoted platen; devices controlling the movement of the platen to advance and retract the same; a spring for actuating the devices for controlling one movement of the platen; and a hand-operated means for actuating the devices for controlling movement of the platen in the opposite direction.

102. In a cash-register the combination with a printing device and means for differentially setting the same to printing position, of an oscillating platen for taking impressions therefrom; a spring controlling movement of the platen in one direction; and an oscillating hand-operated shaft controlling movement in the reverse direction.

103. In a cash-register the combination with type-carriers and means for differentially setting the same, of an oscillatory platen therefor; an oscillatory member controlling the movements of the platen; manipulative means for turning said member in one direction; and a spring tensioned thereby for returning said member to its previous position.

104. In a cash-register the combination with type-carriers and means for setting the same, of an oscillating platen therefor; an oscillating member; a spring connected thereto; manipulative means for moving said member in one direction and thereby tensioning the spring; and means operated from said member and controlling the movement of the platen.

105. In a cash-register the combination with type-carriers and means for differentially setting the same, of a reciprocatory platen; an oscillatory shaft controlling the operation of the platen; a spring for turning the shaft one way; a manipulative operating member for turning the shaft the other way; and a check-severing knife controlled in operation by said operating member.

106. In a cash-register the combination with type-carriers and means for differentially setting the same, of a reciprocatory platen; an oscillatory shaft controlling the operation of the platen; a spring for turning the shaft one way; a manipulative operating member for turning the shaft the opposite way; and a check-severing knife operated by said operating member to sever a check at the final portion of the stroke of the operating member.

107. In a cash-register the combination with type-carriers and means for differentially setting the same, of a reciprocatory platen; an oscillatory shaft controlling the operation of the platen; a spring for turning the shaft one way; a manipulative operating member for turning the shaft the opposite way; a paper-feed device controlled by said oscillatory shaft; and a check-severing knife controlled in operation by said operating member.

108. In a cash-register the combination with type-carriers and means for differentially setting the same, of a platen and an operating device therefor; a paper-feed device; means for varying the length of said feed; a check-severing device; and means for enabling and disabling said severing device to cause the paper to be severed when a long feed obtains but to leave the paper unsevered when the short feed obtains.

In testimony whereof I sign this specification in the presence of two witnesses.

FRANCIS C. OSBORN.

Witnesses:
EFFIE I. CROFT,
CHARLES F. BURTON.